3,295,688
SEPARATION OF FOAMABLE IMPURITIES FROM WATER
John C. Lowe, Broadway, N.J., assignor to Broadway Research and Development Corp., a corporation of Pennsylvania
Filed Dec. 2, 1963, Ser. No. 327,302
7 Claims. (Cl. 210—202)

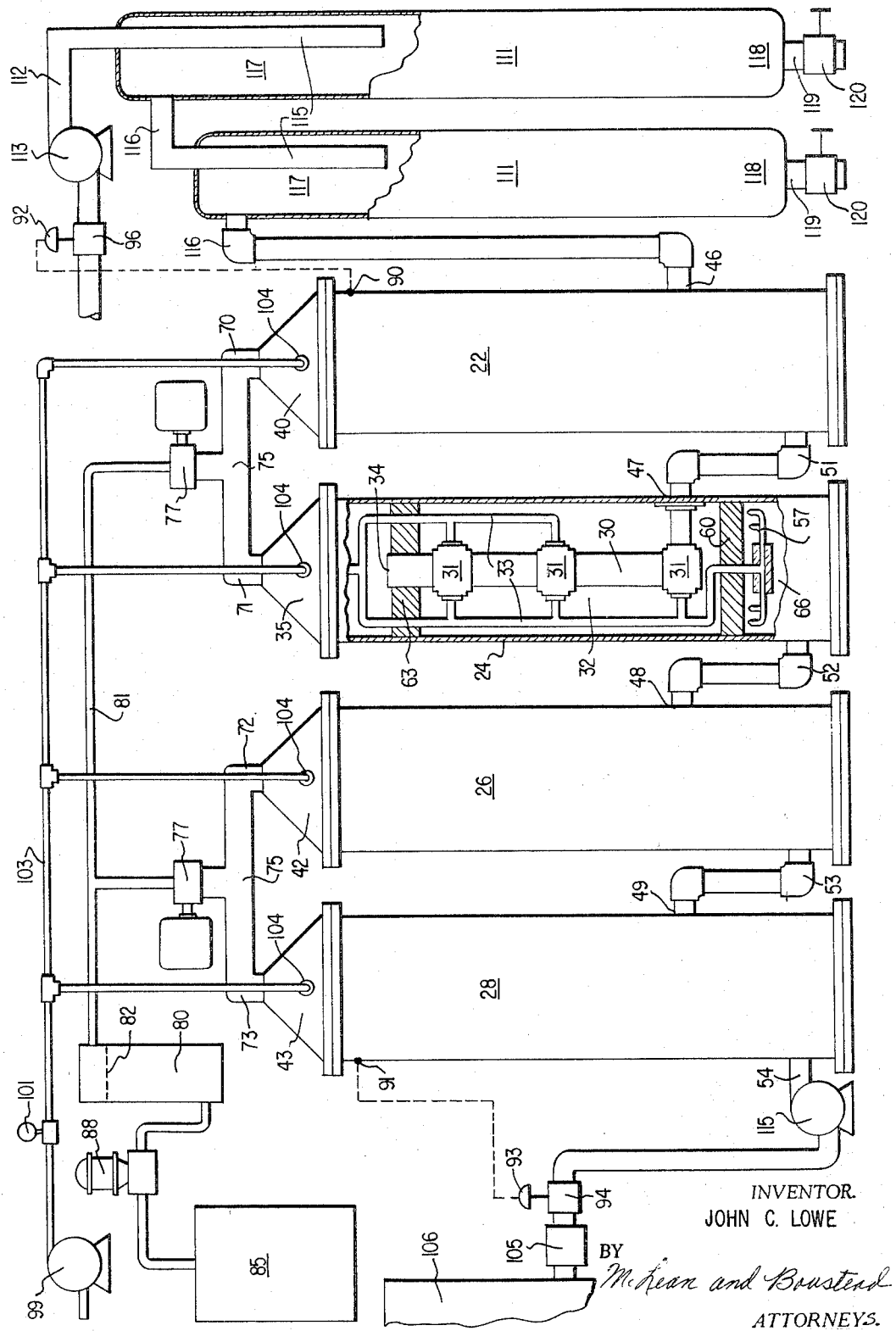

This application is a continuation in part of my copending application Serial No. 304,183, filed August 3, 1963, now abandoned.

This invention is an apparatus for removing synthetic detergents or other foamable impurities from water. As is well known, the presence of large amounts of syndets— synthetic detergents—in modern waste waters is creating an increasingly difficult problem in sewage treatment, since bacterial processing ordinarily does not affect syndets and the disposal of effluents containing syndets is creating esthetic offenses in many parts of the country.

The apparatus of this invention is remarkably effective in separating water from synthetic detergent. The end products are a detergent concentrate or extract which may be burned, buried, absorbed in a solid waste or even reused, if desired, and a water product which is substantially free of detergent, and which may be sent to waste without causing the great foaming or other problems associated with detergent wastes or which, after only simple filtration, may often be reused as industrial water. The apparatus is very simple and of rugged construction with few moving elements. The apparatus is especially useful for installation in commercial laundries which under some proposed laws may be required to pretreat their waste for detergent removal before discharge to a sewage system. The apparatus is capable of modification to a small size suitable for domestic installation or to a large size sufficient for municipal waste treatment.

The apparatus of this invention is an improvement over the apparatus described in my copending application Serial No. 304,183, filed August 3, 1963 and may be used for practicing the method described therein. This copending application is incorporated herein by reference.

The apparatus of this invention provides a plurality of gas-liquid contact chambers or forming chambers in combination with a pump to provide for production and removal of foam from the liquid. Preferably, the foaming chambers are arranged in groups of two and provide for serial flow of the liquid to be treated and parallel flow of foam from the top of each chamber. Advantageously a pump is provided for each group of two foaming chambers, enabling the pump, which serves both to create a slight vacuum and to break up the foam passing to it, to be placed more closely adjacent the foaming chamber and thereby save on the amount of expensive sheet metal duct-work which would otherwise need to be employed. The apparatus of this invention can more fully exploit the capacity of the pump with just two foaming vessels by providing a foaming vessel internal arrangement which is more efficient for foam production than vessels previously proposed. A conduit is provided to carry the broken foam, which is a liquid detergent concentrate, from the detergent pump to a detergent collector which may be provided with a screen or filter to remove dirt carried over with foam. The detergent collector may communicate with a detergent disposal means. Additional water purification apparatus may be provided for treating purified water effluent from the foaming chamber. Normally a filter is provided at the effluent outlet of the foaming chambers as a final purification step.

The apparatus of this invention may further provide for dirt removal from the waste water prior to detergent removal in the foam chambers. The dirt collectors may be elongated vessels which act as gravitational separators. Normally one or more dirt collectors are arranged in series, with their final outlet communicating with the inlet to the foam chambers.

The flow of waste water into the dirt collectors may be automatically controlled so that a predetermined liquid level is maintained in the first foaming chamber while the flow of water from the last foaming chamber may be automatically controlled to maintain a predetermined liquid level in the last foaming chamber. These two control means thus regulate the flow liquid level throughout the apparatus and allow for gravity flow of liquid through the system.

Each of the dirt collectors may be an elongated vessel of any desired cross-sectional shape, preferably cylindrical, which is arranged substantially vertically. It is provided at its upper portion with an inlet conduit for liquid waste containing foamable impurities, such as laundry effluent and this conduit extends, also more or less vertically, about one-fourth to one-third of the way to the bottom of the dirt collector. This downflow conduit preferably has a cross-sectional area of less than half the cross-sectional area of the dirt collector chamber. By making the cross-sectional area of the downflow conduit smaller than an area around it, which, of course, provides for upward flow of the liquid wastes, the upflow velocity is less than the downflow velocity and the tendency of the upflowing liquid to carry dirt and sediment out of the vessel is reduced. Dirt collects at the bottoms of the vessels and any desired means may be provided for its removal therefrom.

The preferred dirt collector not only provides for highly efficient lint removal from laundry wastes, but it also allows the use of inexpensive and convenient construction materials. For example, the chamber may be fabricated from plastic pipe using a smaller diameter pipe, also made of synthetic resin, for the inlet conduit. Polyvinyl chloride is a particularly suitable construction material. Although the dimensions of the chamber may vary, it has been found that highly effective dirt removal may be obtained when the ratio of length to diameter in the chamber is about 10 to 20/1, preferably at least about 15/1. Although one gravitational chamber is sufficient to remove most of the lint and dirt present in the water, it is often found that the most efficient operation is obtained when a plurality of gravitational chambers are used in series.

After passage through the dirt removers when such are used, the liquid containing foamable impurities is passed through a series of foaming chambers. The series may comprise two or more vessels, arranged for serial flow of the liquid waste. The vessels are provided with aeration means and at their tops with means for carrying off the foam produced. Means are provided for conveying the foam from the top of each group of two vessels to a means for comminuting the foam. Ideally this means is a fan or other air pump which also serves to provide a slight vacuum at the top of each vessel to aid in foam production.

The foaming vessel itself usually will provide for two stages of gas contact. An upflow mixture tube is provided for the first stage wherein liquid to be purified passes upwardly past one or more gas entries, after which the liquid and foam overflow this tube into a more quiescent zone which occupies the greater portion of the space within the foaming vessel. Preferably a means is provided whereby the passage of foam into the quiescent zone is retarded. Such a means may be, for example, a fibrous mat surrounding the upflow mixing tube, through which the liquid may easily pass. By the use of such means resolubilization in the very soluble detergent in the liquid is minimized. Further air is introduced into the liquid in this quiescent zone, preferably from the bottom in very finely divided form.

The invention will be better understood by reference to the accompanying drawing, the sole figure of which presents a schematic form, the preferred apparatus of this invention.

In the drawing, an apparatus is shown which has a preliminary dirt removal stage, four stages of detergent removal, a detergent collector and a detergent burner.

The several foaming vessels illustrated are referred to as 22, 24, 26 and 28. As shown in the cutaway view of vessel 24, the foaming vessel contains a more or less centrally located upflow mixing tube 30 having one or more air entries 31, and an outer settling or secondary contact zone 32. Air conduit means 33 are also provided. The mixing tube 30 may be any conduit which will provide for the contact of detergent or other foamable impurity-containing water and air or other foaming gas. An essentially vertical conduit extending upward from a waste water inlet near the bottom of the foaming vessel and having an orifice 34 near the top of the vessel is preferred. The mixing tube communicates through orifice 34 with vacuum chamber 35 and settling zone 32. The mixing tube is also provided at a plurality of points 31, along its length and around its circumference, with the gas lines 33. A sufficient number of lines 33 are provided so that, at a relatively low pressure of air, enough air will be provided to make bubbles of a substantial amount of the detergent present in the waste water. Vacuum chambers 35, 40, 42 and 43 are provided above the outlets of the mixing tubes for removing foam. The mixing tube and air entry lines may be fabricated from synthetic resin tubing such as polyvinyl chloride tubing.

Water containing detergent enters the mixing tube 30 of foaming vessels 22, 24, 26 and 28 through inlets 46, 47, 48 and 49, respectively. The quiescent or settling zone 32, as well as the settling zones of the other vessels, are provided with the liquid outlets 51, 52, 53 and 54.

The quiescent zone 32 is provided with air entry means 57 for further aeration of the liquid to be purified. Preferably a lower fibrous mat 60 is provided to break up air bubbles from the air entry nozzles 57 before the air enters the settling zone 32. An upper mat 63, is also preferably provided to prevent redissolving of the foam in the water. The fibrous mat 63 is preferably provided at a point just below orifice 34 while fibrous mat 60 usually appears in the lower portion of the vessel at a point above air entries 57. Upper mat 63 provides a means for separating detergent bubbles from the water being treated, thus preventing the foam from redissolving. The waste water and detergent foam separate as they flow out of orifice 34 and contact mat 63. The water readily flows through the mat while the foam collects above the mat. The water level is normally maintained at a point below the bottom of the mat. The size of the openings in the mat should be smaller than the detergent bubbles so that the bubbles will tend to collect on top of the mat rather than settling to the bottom of the foaming vessel. Fiber glass is a suitable material for making both upper and lower mats.

The settling zone 32 is preferably provided with a plurality of air entry nozzles 57 connected with gas lines 33 through header 66 and are generally uniformly spaced beneath the lower screen 60. As shown in the drawing, the nozzles may be connected to the header by conduits extending radially from the header. Fibrous mat 60 positioned directly above air entries 57 disperses air bubbles from the air entries so that a uniform and relatively non-turbulent flow of air through settling zone 32 may be maintained.

It can be seen that settling zone 32, which surrounds the mixing tube 30, constitutes a quiescent zone for water exiting from orifices 34, in which settling zone the water still may be subjected to a vacuum from above.

At the top of each vessel 22, 24, 26 and 28 and above the level of the orifice 34 and screen 63 are vacuum chambers 35, 40, 42 and 43. As illustrated, these chambers may be conical or pyramidal in form; they serve as gathering places for the foam bubbles. The top of each vacuum chamber leads to a gas outlet conduit, 70, 71, 72 and 73, respectively. These, in turn, lead to the exhaust headers 75 which, in each pair of vessels, is connected in fluid tight engagement with the gas pump 77. Preferably, this pump is of the blade or propeller type. This pump serves a dual purpose: it creates the gentle vacuum required to lift the foam bubbles out of the vacuum chamber without breaking the bubbles and also serves to break or comminute the bubbles when they reach the blades. The pump 77 may be suitably connected to the reservoir or other means 80 by conduit 81. Liquid detergent concentrate drips from the fan blades and is carried to the reservoir by conduit 81 along with droplets remaining in the exit gas. Conduit 81 may have a small diameter compared to exhaust header 75 because it carries detergent which has been to a great extent, preferably substantially completely, liquefied, rather than foam. A screen 82 may be provided at the inlet to the reservoir 80 to collect lint or dirt that may have been carried over with the foam.

The recovered detergent concentrate may generally be reused. However, in some cases, reuse of the detergent may be undesirable. A convenient method of disposing of waste detergent is to burn the detergent in burner 85. Detergent to be burned is pumped into burner 85 by the atomizer pump 88 causing the detergent to enter the burner as a fine mist or spray. This mist is contacted with a hot oxidizing gas which causes combustion of the detergent and the formation of gases which are vented to the atmosphere. An apparatus suitable for such combustion is described in my copending application Serial No. 327,308, filed of even date herewith.

A single foaming vessel may sometimes be used. However, for most efficient operation the arrangement of foaming vessels as shown is preferred. In this arrangement, four vessels are used. The water being treated passes through each vessel in series. Each pair of vacuum chambers 40–41 and 42–43 are connected in a parallel foam flow path. Such a parallel connection allows the application of different vacua to each pair of vacuum chambers. This may sometimes be desirable because detergent is present in a lower concentration in the second set of foaming vessels and thus a greater vcauum may be necessary in the second pair of vessels. The proper liquid level in the vessels may be automatically maintained by liquid level recorders 90 and 91, controllers 92 and 93 and valves 94 and 96.

The apparatus is provided with means for supplying inert foaming gas to gas lines 33. These means preferably comprise the air pump or compressor 99, which may lead by means of a regulator 101 to the gas inlet header 103. The inert gas travels to each vessel by lines 104 which enter the vessels and are connected to the branch line arrangements 33.

The final liquid effluent conduit 54 may lead through filter 105 to tank 106 where the waste water may be held for subsequent conventional sewage treatment, filtration for recirculation to the laundry, etc. The major amount of lint and other light fibrous material in the waste water becomes entrained in the detergent bubbles in the vessels 22, 24, 26 and 28 and passes to the reservoir 80, allowing filter 105 to operate for long periods without clogging.

In order to provide more complete treatment of waste water containing foamable detergents, one or more dirt collectors 111 may be provided. Waste water from the laundry or other detergent-using operation enters dirt collector 111 through the inlet 112. A pump 113 and valve 96 may be provided to insure and regulate flow respectively.

The dirt collector 111 is provided at its upper portion with an inlet conduit 115 which descends more or less vertically from the closed top of the vessel about one-fourth to one-third of the way toward the bottom. As shown, the waste water inlet is at one side of the top of the settler and the other side of the top is provided with the outlet conduit 116. The inlet 115 is located near one side of the vessel and preferably, the distance from the outlet to the exterior of the conduit is at least as great as an inner radius of the vessel. Also, as mentioned, the cross-sectional area of up-flow zone 117 is preferably larger than the cross-sectional area of conduit 115.

The bottom of the dirt collector 118 is provided with the dirt removal conduit 119 and valve 120. It can be seen that the dirt removal apparatus provides for settling of the solids carried by the waste water into the bottom portion 118. When discharge of the dirt is required, the valve 120 is opened and this allows the dirt to pass into a collection vessel (not shown) without the constant supervision of an attendant or a great disturbance of the normal water flow through chambers 111. Preferably two identical gravitational chambers are used in series as shown, but as previously stated, any number of chambers may be employed.

What is claimed:

1. An apparatus for treating water which comprises an upright vessel with an upright internal mixing tube, a liquid inlet leading to the interior of said tube and a liquid outlet from the vessel, a fibrous mat in the flow path between the outlet of said tube and the liquid outlet of said vessel, said tube being supplied with a plurality of orifices for inert gas to contact liquid within the tube and means for passing inert gas through said orifices, a duct for foam removal provided the top of said vessel and a pump connected to said duct.

2. The apparatus of claim 1 in which a second means for gas contact is provided outside said mixing tube.

3. The apparatus of claim 2 in which the gas contact means, outside of the said tube comprises a plurality of orifices for gas entry into the liquid and a second fibrous mat above the last mentioned orifices for gas distribution in the liquid.

4. An apparatus for treating water containing a foamable impurity which comprises a liquid-solid separator comprising a vertically elongated vessel having an upper outlet and an inlet conduit opening into the vessel and descending from the top of the vessel to define a downflow portion through the inlet conduit, the cross-sectional area of said downflow portion being less than the cross-sectional area of said vessel, a conduit connecting said outlet to the internal mixing tube of an upright foaming vessel, said foaming vessel having a vacuum chamber for collecting foam, a quiescent settling chamber outside of said internal mixing tube, and a liquid outlet from the foaming vessel, said mixing tube being supplied with a plurality of orifices for inert gas to contact liquid within the mixing tube and means for passing inert gas through said orifices, the top of the vacuum chamber being provided with a duct for foam removal, a gas pump connected to said duct, and a second means for introducing foaming gas into said quiescent settling chamber.

5. An apparatus for treating water containing a foamable impurity which comprises a liquid-solid separator comprising a vertically elongated vessel having an upper outlet and an inlet conduit opening into the vessel and descending from the top of the vessel to define a downflow portion through the inlet conduit, the cross-sectional area of said downflow portion being less than the cross-sectional area of said vessel, a conduit connecting said outlet to the internal mixing tube of an upright foaming vessel, said foaming vessel having a vacuum chamber for collecting foam, a quiescent settling zone outside of said internal mixing tube and a liquid outlet from the foaming vessel, said mixing tube being supplied with a plurality of orifices for inert gas to contact liquid within the mixing tube and means for passing inert gas through said orifices, said foaming vessel being provided with a second gas contact means outside said tube which comprises a plurality of orifices for gas entry into the liquid and a fibrous mat above the last mentioned orifices for gas distribution in the liquid.

6. An apparatus for treating water which comprises an upright vesseel with an upright internal mixing tube supplied with a plurality of orifices for inert gas to contact liquid within the tube, said tube opening into the upper portion of said vessel, means for passing inert gas through said orifices, a liquid inlet leading to the interior of said tube and a liquid outlet from the lower portion of said vessel, a first fibrous mat surrounding said mixing tube just below the top of said tube, and a means for gas contact outside said mixing tube in the vessel above said liquid outlet comprising a plurality of orifices for gas entry into the liquid and a second fibrous mat above the last mentioned orifices for gas distribution in the liquid.

7. An apparatus for treating water which comprises a vessel with an outlet near the bottom and an inlet communicating with a mixing tube within said vessel, said tube having an outlet within said vessel at a point above the outlet of said vessel, said tube being provided with a plurality of orifices for foaming gas to contact liquid within said tube and means for passing inert gas through said orifices, said vessel being provided with means outside of said tube for foaming gas to contact liquid within said vessel, a duct for foam removal provided the top of said vessel and a pump connected to said duct, said gas contact means outside of the said tube comprising a plurality of orifices for gas entry into the liquid and a fibrous mat above the last mentioned orifices for gas distribution in the liquid.

References Cited by the Examiner

UNITED STATES PATENTS

| 1,176,428 | 3/1916 | Callow | 210—221 X |
| 1,407,258 | 2/1922 | Connors | 210—44 X |
| 1,912,228 | 5/1933 | Shimmen et al. | 209—170 |
| 2,230,385 | 2/1941 | Pecker | 210—44 X |
| 2,436,375 | 2/1948 | Booth et al. | 210—73 X |
| 2,669,440 | 2/1954 | Lindenbergh | 210—221 X |
| 2,695,710 | 11/1954 | Gibbs | 210—221 X |
| 2,978,234 | 4/1961 | Lamb | 210—220 X |
| 3,050,188 | 8/1962 | Nisser et al. | 209—170 |
| 3,169,841 | 8/1962 | Weis | 55—178 X |
| 3,192,155 | 6/1965 | Bready et al. | 210—221 X |

FOREIGN PATENTS

| 1,163,122 | 4/1958 | France. |

SAMIH N. ZAHARNA, *Primary Examiner.*

REUBEN FRIEDMAN, *Examiner.*

J. D. CESARE, *Assistant Examiner.*